June 22, 1971 W. W. BUTLER 3,585,697
PROCESS FOR FORMING APERTURES IN DUCTILE STRIPS
Filed July 28, 1969 4 Sheets-Sheet 2

INVENTOR.
WARWICK W. BUTLER
BY Christopher C. Dunham
ATTORNEY

June 22, 1971 W. W. BUTLER 3,585,697
PROCESS FOR FORMING APERTURES IN DUCTILE STRIPS
Filed July 28, 1969 4 Sheets-Sheet 3

INVENTOR.
WARWICK W. BUTLER
BY
Christopher C. Dunham
ATTORNEY

United States Patent Office 3,585,697
Patented June 22, 1971

3,585,697
PROCESS FOR FORMING APERTURES IN DUCTILE STRIPS
Warwick W. Butler, 28 M. Rivera Ferrer, San Patricio, Caparra Heights, Puerto Rico 00920
Filed July 28, 1969, Ser. No. 845,434
Int. Cl. B21d *31/04*
U.S. Cl. 29—6.2                                    15 Claims

ABSTRACT OF THE DISCLOSURE

In procedure for forming a row of apertures along an edge of a metal strip, a row of slits is cut in the strip in adjacent parallel relation to the strip edge, and as each slit is cut, a strand portion of the strip between the slit and the strip edge is stretched in a direction transverse to the major surface planes of the strip. Thereafter the strand portions are flattened and deformed outwardly in the major surface planes of the strip so as to open the slits in the major surface planes.

BACKGROUND OF THE INVENTION

This invention relates to a process for forming a row of apertures along one or both longitudinal edges of a strip of ductile material such as a metal or ductile plastic or the like.

It is common practice to preform a row of slots or other apertures along an edge of a metal strip article (e.g. a flat, angle, or channel member to facilitate assembly of the article with other elements as in a metal framework or furniture construction. For example, steel angle members are commonly used as upright corner supports for storage shelves, the shelves being secured to the angle members by screws, hooks or lugs projecting through slots in the flanges of the angle members; preferably, a row of longitudinally spaced slots is preformed in each flange of the angle member to enable ready positioning of the shelves at selected heights.

For reasons of economy, it is desirable that metal strip articles with preformed apertures as used for the foregoing and other purposes employ as little metal as possible, consistent with the structural strength required for the intended use. It is also desirable (particularly for furniture constructions and the like) that such articles have an attractive and aesthetically pleasing appearance.

Conventional methods of forming a row of apertures along an edge portion of a metal strip article involve removing portions of the metal, as by punching, drilling, or burning, to produce the apertures. These methods are wasteful of metal, in that the removed portions of the strip cannot contribute to the strength of the strip and are usable (if at all) only as scrap; particularly for fabricators in localities remote from sources of blank metal strip, such waste may constitute a substantial economic disadvantage. Moreover, the conventional cutting, drilling or burning of a row of holes in a metal strip article is inconveniently laborious, and adds little if anything to the aesthetic appearance of the strip.

A known way of forming apertures in flat metal articles without significant loss of metal is by so-called expanded metal techniques, wherein plural rows of staggered slits are cut in the article and then opened by spreading and/or rolling the article to produce an open mesh structure. However, because these techniques (performed by special and relatively complex apparatus) require cutting and simultaneous opening of plural adjacent rows of slits having a particular positional relationship, they are not suitable for use in forming a single row of apertures along an edge portion of a metal strip while leaving the central, major portion of the strip solid (i.e. imperforate) as desired to provide the strength necessary for use of the strip as a structural support.

SUMMARY OF THE INVENTION

An object of the present invention is to provide a new and improved process for forming a single row of spaced apertures along a longitudinal edge portion of a ductile strip (or two rows of apertures respectively extending along two opposite edges of such strip), in a simple, economical and convenient manner, without any significant loss of metal from the strip incident to formation of the apertures. Another object is to provide such a process for producing an apertured-edge ductile strip characterized by superior structural strength for a given weight of strip material, and by a novel attractive aesthetic appearance.

To these and other ends, the process of the invention broadly contemplates cutting a row of spaced slits along a longitudinal edge portion of a blank strip of ductile material, the slits extending in aligned relation to each other and in adjacent parallel relation to the strip edge; and as each slit is cut, stretching a strand portion of the strip, disposed between the slit and the strip edge, in a direction transverse to the major surface planes of the strip. The stretching of the strands forms them into serrations projecting along the strip edge from one major surface of the strip, and opens the slits in a plane transverse to the strip major surface planes.

There is thus produced a strip article having a row of apertures formed in an edge portion and capable of use as a structural support. Preferably, however, and further in accordance with the invention, the process includes the additional step of flattening the stretched strands into the major surface planes and simultaneously deforming them outwardly with respect to the center line of the strip so as to open the slits in the major surface planes of the strip. The resultant article has a row of spaced apertures extending along a longitudinal edge portion and opening in its major surface planes, with a wavy or serrated configuration imparted to the strip edge by the outward deformation of the strands.

This article (fabricated, for example, of a ductile metal such as steel, although other ductile metals or even nonmetallic materials, e.g. ductile plastics, may be employed) may be bent once longitudinally to form an angle member, or bent twice longitudinally to form a channel member, or left as a flat strip; also, a second row of apertures may be formed along its second longitudinal edge, again by the process of the invention as summarized above. The apertures produced by the present invention are formed without significant loss of metal from the strip, because they are established by cutting and opening slits in the strip rather than by removing portions of metal from the strip. The article having these apertures may be used for many of the purposes (including, e.g. shelf supports) for which conventional strip articles with punched or like slots are now employed, and requires a substantially lower weight of strip material, to achieve a given structural strength, than such conventional article. Also, the aforementioned wavy edge provides an unusual and attractive appearance.

In the presently preferred practice of the invention, each slit is cut by forcibly advancing a tooth-shaped die member having a squared-off inner cutting edge against a major surface of the strip edge portion in a direction transverse to the strip major surface planes, while supporting the strip inwardly of the edge portion. The die member shears through the strip, cutting the slit, and simultaneously pushes the adjacent strand portion of the strip (i.e. the strand disposed between the slit and the strip edge) out of the major surface planes, stretching the strand in the transverse direction in which the die member is advancing. The step of flattening and outwardly deforming the stretched strands may be effected by pressure-rolling the strip, or at least the strip edge portion containing the strands, in such manner that the rolling pressure advances outwardly across the strip toward the edge adjacent to the slits, in a direction transverse to that edge, i.e. so that as the rolling pressure flattens the strands it simultaneously pushes them outwardly from the strip center line. Alternatively, the strands may be flattened by pressing the slit strip edge portion between plane parallel face portions of a pair of dies, with the strip edge and die faces in such relative orientation that the dies exert pressure on the strands in a direction effective to deform them outwardly. The initial stretching of the strands facilitates their subsequent outward deformation by the flattening rollers or dies, to effect opening of the slits in the major surface planes of the strip.

DETAILED DESCRIPTION

Referring to the drawings, FIGS. 1-8 illustrate schematically the successive steps involved in forming a row of regularly spaced identical apertures along a longitudinal edge of a workpiece comprising a flat strip of ductile material, in accordance with a particular embodiment of the method of the present invention. The workpiece may, for example, be a blank strip 10 of steel having plane parallel horizontal upper and lower major surfaces respectively designated 11 and 12 and a rectilinear longitudinal edge 14, although the method of the invention is also applicable to other strips, e.g. fabricated of metals other than steel or of ductile nonmetallic materials such as ductile plastics.

In the initial step of the method, a plurality of regularly spaced slits 15, extending in adjacent and parallel relation to the strip edge 14 and aligned in a single row, are cut in a longitudinal edge portion 16 of the strip 10. The slots are spaced inwardly from the edge 14 by portions 17 of the strip lying between the slits and the strip edge 14; these strip portions 17 are herein termed strands.

Preferably concurrently with the cutting of the slits, the strands 17 are stretched in a direction perpendicular to the major surface planes of the strip, to form a row of serrations (as seen in elevational view, FIG. 4B) projecting perpendicularly downward from the major surface 12 of the strip 10. As the strands are thus stretched, the slits 15 open in a common plane perpendicular to the strip major surfaces, so that each strand 17 in cooperation with the adjacent portion of the main body of the strip defines an aperture 15a having edges lying in the last-mentioned common plane.

Figures 1, 2, 3, 4, 5, 6, 7, 8:
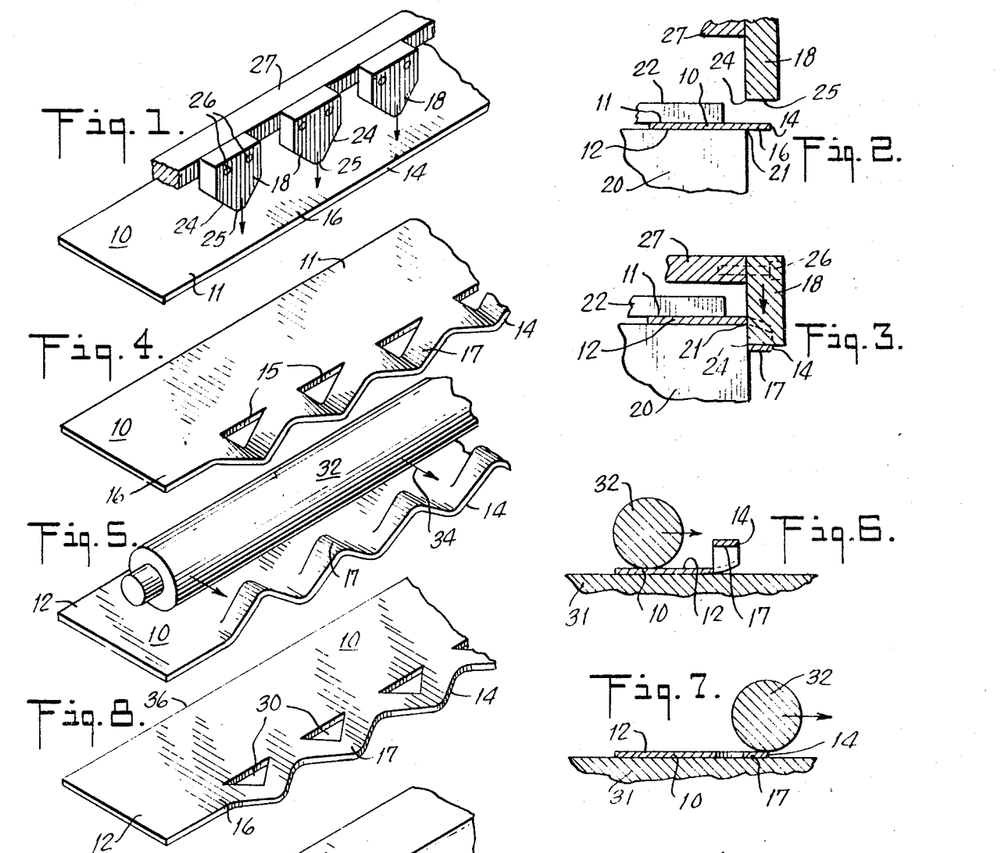
FIG. 1 is a schematic perspective view showing the slit-cutting step of the process of the present invention in an illustrative embodiment, showing a plurality of die members advancing toward a strip of ductile material to form a row of slits therein in accordance with the present invention.
FIG. 2 is a sectional elevational view corresponding to FIG. 1.
FIG. 3 is a view similar to FIG. 2, showing a die member stretching a strand portion of the strip.
FIG. 4 is a perspective view of the strip, showing the row of slits and the strands as stretched by the die members shown in FIGS. 1-3.
FIG. 5 is a schematic perspective view of the rolling step of the process of the present invention in an illustrative embodiment, showing a pressure roll advancing toward the slit edge portion of the strip of FIG. 4 in a direction transverse to the edge.
FIG. 6 is a sectional elevational view corresponding to FIG. 5.
FIG. 7 is a view similar to FIG. 6, showing a strand being flattened into the strip major surface planes and simultaneously deformed outwardly from the strip.
FIG. 8 is a perspective view of the strip, showing the row of spaced openings formed along the edge of the strip by the rolling step.

As illustrated in FIG. 1–3, the cutting of each slit 15 and the stretching of the adjacent strand 17 may be effected simultaneously by forcibly advancing a tooth-shaped movable die member 18 (e.g. fabricated of hardened steel) vertically downward against the horizontal upper surface 11 of the strip edge portion 16 while the strip is supported, inwardly of edge portion 16, on a stationary platen or die block 20. It is to be understood that the terms "inner" and "inward," and "outer" and "outward," as used herein, refer respectively to lateral directions toward and away from the longitudinal geometric axis or center line of the strip 10, i.e. in the strip major surface planes.

The lower surface 12 of the horizontally oriented strip 10 rests on a horizontal upper surface of the die block 20, which terminates outwardly in a horizontally extending squared-off edge 21 spaced inwardly from and lying parallel to the strip edge 14. More particularly, edge 21 lies essentially in a vertical plane containing the line along which the slits 15 are to be cut. The strip 10 is held in place on the die block by a pressure plate 22, which bears down against the strip upper surface 11 inwardly of the strip edge portion 16 so as to prevent movement of the strip while a slit or slits are being cut.

Each die member 18 has a plane vertical inner face 23 with a squared-off lower edge 24 that includes portions 24a and 24b converging downwardly in the plane of face 23 to a curved or horizontal central portion 24c (FIG. 3A); i.e. in the plane of face 23, edge 24 has a generally V-shaped configuration with a curved or blunted apex. The die member 18 is disposed in outwardly offset relation to the die block 20, with face 23 parellel to the die block edge 21, so that when member 18 is advanced downwardly it passes outwardly of but in substantially contiguous relation to the outer side face of the block 20. Thus, upon such downward advance of the member 18, its edge 24 and the die block edge 21 engage the opposite major surfaces of the strip edge portion 16 on opposite sides of the lines on which slits 15 are to be cut, and downward force applied to member 18 causes its edge 24 to shear through the strip edge portion 16 along the last-mentioned line, cutting a slit 15, as shown in FIG. 3. The length of the slit is determined by the horizontal dimension of the die member 18, in a direction parallel to the strip edge 14, at the depth to which the die member penetrates the strip.

As a slit 15 is being cut, the nose 25 of the die member 18 presses downwardly against the central portion of the strand 17 adjacent to that slit; this downward force of the die member on the strand stretches the strand vertically downward into the form of a serration projecting downwardly from the strip major surface 12, opening the slit 15 in a vertical plane. Thus cutting of a slit, and stretching of the adjacent strand, are simultaneously accomplished by the forcible downward advance of the member 18. The curved or blunted apex of the cutting edge 24 of member 18 prevents lateral shearing of the strand during the operation. Preferably, the thickness of member 18 (i.e., its horizontal dimension perpendicular to face 23) is at least about equal to the width of the strand 17 between slit 15 and strip edge 14, so that the die nose 25 engages substantially the full width of the strand to facilitate the desired stretching of the strand.

Various apparatus arrangements may be employed to perform the operation just described. FIG. 1 illustrates an arrangement in which a large plurality of movable die members 18 are simultaneously brought downwardly against the strip edge portion 16 to form a corresponding plurality of slits 15 and to stretch the strands 17 adjacent to these slits. The members 18 are securely and fixedly mounted as by screws 26 in regularly spaced relation to each other (corresponding to the desired spacing of the slits), and with their faces 23 in a common vertical plane, on a horizontal bar 27 which extends above and parallel to the strip edge portion 16. Means (not shown) are provided for effecting vertical reciprocating movement of the bar 27 while exerting sufficient downward force during the downstroke of the bar to cut the slits 15 and concurrently to deform the strands 17 in the strip 10. The bar 27 with die members 18, and die block 20, may readily be incorporated in conventional types of punch presses or other metal-working power presses, with the die block 20 bolted to the press bed and the die member 18 moved by the stroke of the press, which imparts the requisite downward force thereto; the manner in which such conventional press equipment may be adapted to perform the present process will be readily apparent to those skilled in the art, and accordingly need not be described in detail.

Figures 1A, 1B, 4A, 4B, 11, 12, 13:
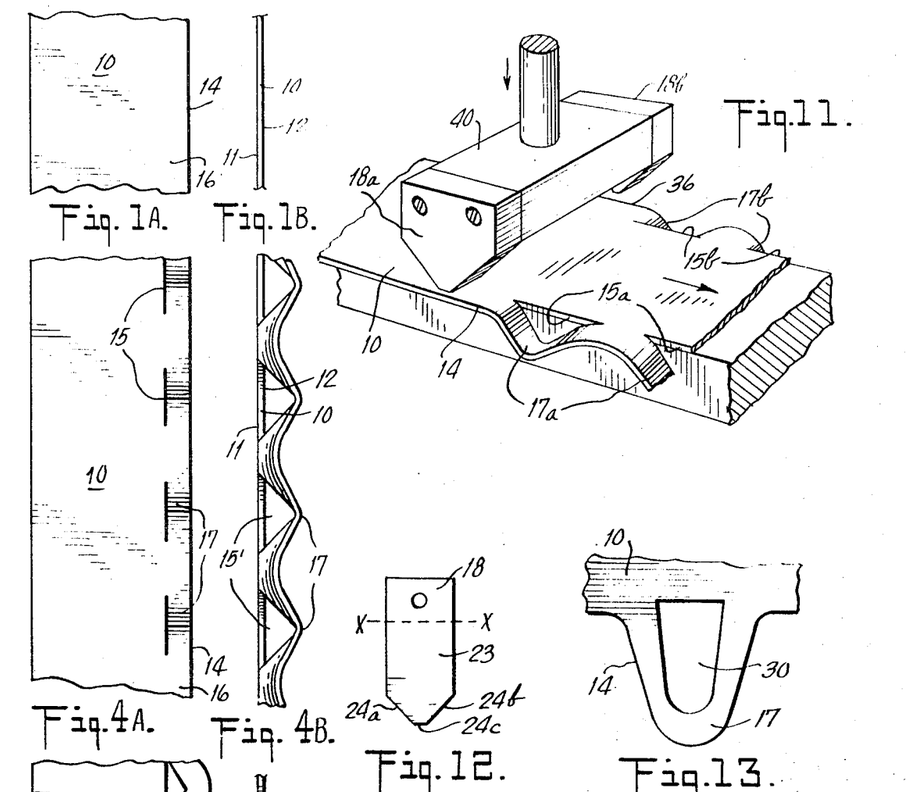
FIG. 1A is a fragmentary plan view of the strip shown in FIG. 1.
FIG. 1B is a fragmentary elevational view of the strip of FIG. 1.
FIG. 4A is a fragmentary plan view of the strip shown in FIG. 4.
FIG. 4B is a fragmentary side elevational view of the strip of FIG. 4.
FIG. 11 is a schematic perspective view of an alternative arrangement for cutting slits along edges of the strip of FIG. 1.
FIG. 12 is a side elevational view of one alternative shape of movable die member that may be used in the practice of the present invention.
FIG. 13 is a plan view of a portion of a strip having an aperture formed using the die member of FIG. 12.

The slitting operation described above forms, in the strip 10, a row of regularly spaced apertures 15a extending along the longitudinal strip edge portion 16 and opening, as stated, in a plane perpendicular to the major surface planes of the strip, as shown in FIGS. 4, 4A and 4B. This apertured strip has utility for various structural and/or ornamental purposes, for example to support shelves having projections extending through some of the apertures. However, for many purposes for which metal strip articles having punched holes have heretofore been used, it is preferred that the apertures of the strip open in the major surface planes of the strip rather than perpendicularly thereto, i.e. that the edges of the apertures lie in such major surface planes.

To this end, further in accordance with the invention, the strip in the form shown in FIG. 4 may be subjected to an additional working step to flatten the stretched strands 17 back into the major surface planes of the strip 10 while concomitantly deforming the strands outwardly with respect to the center line of the strip so as to impart to the strip edge 14 a wavy or serrated configuration, i.e. in the major surface planes of the strip. This outward deformation of the strands opens the slits 15 in the major surface planes of the strip; thus each outwardly deformed strand 17, in cooperation with the adjacent portion of the main body of the strip, defines an aperture 30 of more or less triangular configuration, to provide along the longitudinal strip edge portion 16 a row of such apertures 30, regularly spaced along the portion 16 and each having edges lying in the major surface planes of the strip.

As shown schematically in FIGS. 5–7, this flattening and outward deformation of the stretched strands 17 may be effected by pressure-rolling at least the edge portion 16 of strip 10 (after the slits 15 and stretched strands 17 have been formed therein by the operation described above) in a direction transverse to the strip edge 14, so that the rolling pressure advances outwardly across the strip to the edge 14, e.g. perpendicularly to that edge. For simplicity of illustration, the rolling operation is represented in FIGS. 5–7 as effected by placing the strip to be rolled on a horizontal platen 31 with the stretched strands 17 projecting upwardly, and advancing a movable pressure roll 32 outwardly across the strip in a direction (indicated by arrows 34) perpendicular to edge 14. As the roll 32 comes into engagement with the upwardly projecting strands 17, it flattens them into the major surface planes of the strip and concomitantly pushes them outwardly, deforming them so as to open the slits 15 into apertures 30 in the major surface planes, and to impart to the strip edge 14 in those planes a wavy or serrate configuration. As will be understood, the initial stretching of the strands facilitates their subsequent slit-opening deformation by this simple flattening step.

While the flattening operation is shown as performed by a single movable pressure roll 32, a pair of movable rolls may be used, engaging opposite major surfaces of the strip and advancing across the strip in the direction of arrows 34; or the strip may be passed laterally through the nip of a pair of stationary pressure rolls in such direction that edge 14 is the trailing edge of the strip passing the nip. Preferably, the rolling pressure (however applied) is of such magnitude as to effect flattening of the strands 17 without significantly reducing the strip thickness.

After the strip has been rolled, the edges of the apertures 30 may be smoothed by deburring in conventional manner.

Figures 3A, 9, 10:
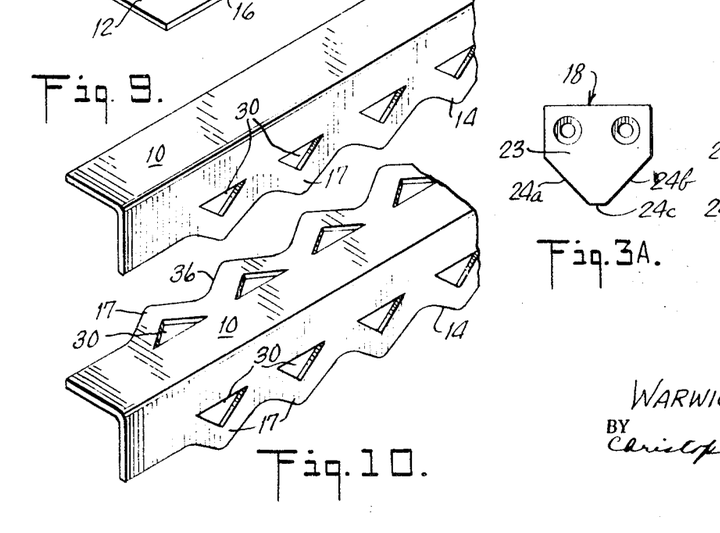
FIG. 3A is a side elevational view of one of the movable die members shown in FIG. 1.
FIG. 9 is a perspective view of the strip bent along its longitudinal axis to form an angle.
FIG. 10 is a perspective view of a strip having rows of spaced openings formed respectively along two longitudinal edges of the strip in accordance with the invention, the strip being bent along its longitudinal axis to form an angle.
Figure 3B:
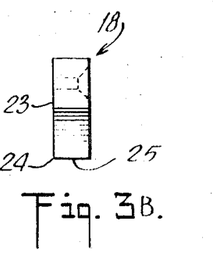
FIG. 3B is an end elevational view of the die member of FIG. 3A.

If desired, the strip may be bent (e.g. by conventional procedure) 90° along its longitudinal axis to form an angle member having a row of apertures 30 extending along one flange as shown in FIG. 9. Also, if desired, a second row of apertures 30 may be formed in the strip (by the above-described method of the present invention) along the longitudinal edge 36 opposite to edge 14; and this strip having a row of apertures along each edge, may similarly be bent on its longitudinal axis to form an angle member with a row of apertures in each flange, as shown in FIG. 10.

The apertured angle member produced by the above-described procedure may be used, in place of a conventional steel angle member having punched holes, as a vertical corner support for shelves, or for other purposes. It is found in some cases to be characterized by superior strength, as compared with conventional punched angle members of equivalent dimensions, and its production involves no significant loss of metal from the blank strip because the apertures 30 are formed by expansion of slits 15 (cut in the strip without loss of metal) rather than being punched out. Also, the serrated or wavy configuration imparted to the strip edge 14 and/or edge 36 gives the strip a novel and decorative appearance.

By way of specific example of the process of the present invention as embodied in the procedure set forth above, two rows of slits 1½ inches apart on centers are cut along the two longitudinal edges, respectively, of a blank strip of 14-gauge steel 2⅛ inches wide, utilizing die members that produce generally triangular openings 5/16 inch in altitude, mounted in a fast punch press. Each row of slits is spaced 5/16 inch inwardly from the adjacent strip edge. The strands adjacent to the slits are concomitantly stretched in a direction perpendicular to the major surface planes of the strip. When the strip edges are rolled to flatten the strands and deform them outwardly with respect to the center line of the strip, the maximum width of the strip is increased by about 5/16 inch on each side of the center line (i.e. a distance corresponding to the altitude of each triangular aperture formed by the present method), so that the overall maximum width of the strip, between the vertices of opposed outwardly deformed strands on the two edges of the strip, is 2¾ inches.

If the strip is bent at a 90° angle along its longitudinal axis, there is produced an angle member having two identical flanges with serrated edges and uniformly spaced, generally triangular openings 5/16 inch in altitude and 1½ inch apart on centers. The distance from the center of each opening to the flange edge is approximately 15/32 inch. The maximum width of each flange (at the vertex of each serration) is about 1⅜ inch, and the minium width of each flange (between serrations) is about 1 1/16 inch.

This angle member is equivalent in effective dimensions (i.e. overall flange width, strand width, aperture position, and width of the central portion as measured transversely between the inner margins of opposed apertures) to a straight-edged conventional 14-gauge steel angle member having a flange width of 1⅜ inch and a row of drilled, punched, or burned-out apertures in each flange, spaced (as in the member produced by the present method) ¾ inch from the central bend of the angle. However, the amount of steel required for the equivalent conventional angle member may be more than 20% greater than that required for the member produced in accordance with the present invention. In some commercially practicable cases, it is found that the strength of an apertured strip produced in accordance with the present invention is comparable to or even somewhat greater than the strength of a conventionally produced strip of equivalent effective dimensions, even though, as stated, substantially more metal is required for the conventional strip than for the strip produced by the present process.

While the method of the invention has been described as employing a row of aligned die members 18 arranged to cut a large plurality of slits 15 simultaneously along an edge of the workpiece, a single reciprocating die member 18 may be used to form a row of slits 15 with successive strokes as the strip 10 is fed intermittently in a longitudinal direction past the die member, the spacing between slits (and hence the spacing between adjacent apertures in the ultimately produced apertured strip) being determined by the extent of feed of the strip between successive die strokes.

One illustrative arrangement of apparatus for such operation, designed to cut two slits simultaneously respectively adjacent to opposite longitudinal edges of a steel (or other ductile material) strip 10, is shown schematically in FIG. 11. Two die members 18a and 18b (each identical to the die members 18 described above) are respectively fixedly secured, in parallel relation to each other, at opposite ends of a horizontal bar 40, which is mounted (for example) in a conventional metal punch press (not shown). Bar 40 extends laterally relative to the strip. The strip 10 to be worked is advanced horizontally, but suitable and e.g. conventional means providing intermittent longitudinal feed, along the top face of a die block 20, which is bolted to the press bed. As the strip is advanced intermittently beneath the die members 18a and 18b, each down-stroke of the press causes the die members (in cooperation with the squared-off upper edges of die block 20) to cut a pair of parallel slits respectively designated 15a and 15b adjacent and parallel to the opposite longitudinal edges of the strip. Concomitantly, the strands 17a and 17b adjacent to these slits are stretched downwardly by the respective die members. The strands may subsequently be flattened and deformed outwardly, as by rolling in the manner described above, to produce a strip having two rows of generally triangular apertures opening in its major surface planes and respectively extending in spaced relation along the opposite longitudinal edges of the strip.

In the practice of the present invention, the size, shape and spacing of the produced apertures, and their disposition on the strip, may be varied substantially to meet particular requirements.

The spacing of the apertures, and their position in relation to the strip edge, are governed by the disposition of the die members 18 relative to each other (when plural die members are used), and/or by the extent of feed of the strip past the locality at which the slits 15 are cut between successive strokes of the die member (when a single die member 18 successively cuts all the slits formed along an edge of the strip), as well as by the spacing between the strip edge 14 or 36 and the locus of contact of the die member or members 18 with the strip. Stated in general, for any given strip, the maximum geasible width of the strands 17—i.e. the upper limit of spacing between the slits 15 and the adjacent strip edge— is dependent on such factors as the thickness and ductility of the strip; in other words, the strand width must be sufficiently small so that the strand is capable of undergoing the above-described successive deformations that open the slit into an aperture in the major surface planes of the strip, and this limit of strand width is determined by the ability of the strand to be thus deformed.

The shape of the produced apertures 30 is dependent, inter alia, on the direction of advance of rolling pressure in the rolling step which flattens the strands 17. For example, in the procedure illustrated in FIGS. 5–7, the direction of rolling pressure is perpendicularly outward from the center line of the strip toward the longitudinal strip edge 14, and the resultant apertures have the general form of isosceles triangles. If, however, the direction of rolling pressure advancing outwardly to the strip edge 14 is diagonally transverse (rather than perpendicularly transverse) to that edge, the resultant apertures have the general form of scalene triangles elongated in the direction of the rolling pressure, and the configuration of the serration-like shapes of strands 17 is correspondingly modified.

Figure 8A:
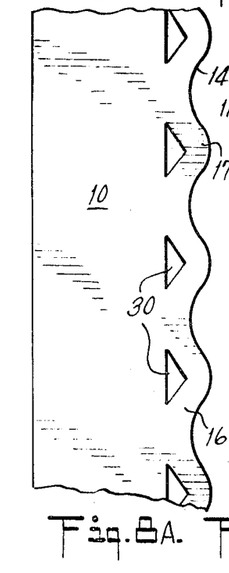
FIG. 8A is a fragmentary plan view of the strip shown in FIG. 8.
Figures 8B, 14:
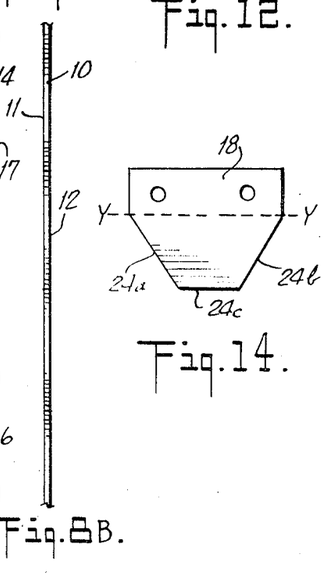
FIG. 8B is a fragmentary side elevational view of the strip of FIG. 8.
FIG. 14 is a side elevational view of another alternative shape of die member.
Figure 15:
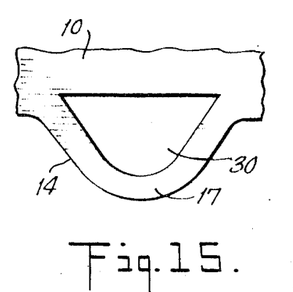
FIG. 15 is a plan view of a portion of a strip having an aperture formed using the die member of FIG. 14.

Other factors determining the shape, and also the size, of the apertures 30 are the size and shape of the die member or members 18 and the depth to which the die member or members penetrate the strip in cutting the slits 15. A die member 18 which is vertically elongated and relatively short in horizontal dimension parallel to the center line of the strip (as shown in FIG. 12), penetrating a horizontally disposed strip to the comparatively deep level X—X indicated in FIG. 12, will form an aperture 30 that, after rolling, has its major axis extending transversely of the strip center line, as shown in FIG. 13. On the other hand, a die member 18 that is horizontally elongated in a direction parallel to the center line of the strip, as shown in FIG. 14, penetrating a horizontally disposed strip only to the relatively shallow level Y—Y (FIG. 14), will form an aperture 30 that, after rolling, has its major axis extending parallel to the strip center line (FIG. 15). Aperture shapes other than triangular (e.g. lune shapes) may also be produced, by cutting the slits 15 and initially deforming the strands 17 with die members 18 of appropriately modified configuration.

Reference now to FIGS. 16–21, there is shown a multistage die arrangement 45 for performing the process of the present invention in a further illustrative embodiment thereof. This arrangement comprises a vertically movable three-stage upper die 46 and a stationary three-stage lower die 47. Specifically, the upper die has three sections 46a, 46b and 46c, while the lower die similarly has three sections 47a, 47b and 47c, respectively positioned and adapted to cooperate with the three sections of the upper die to provide three die stages; i.e. die sections 46a and 47a together constitute a first die stage, sections 46b and 47b constitute a second die stage, and sections 46c and 47c constitute a third die stage. The dies 46 and 47 are adapted to be mounted in a conventional punch press through which a strip 10 of ductile material is fed longitudinally, in a horizontal direction represented by arrow 48, so as to transverse the aforementioned three die stages in succession.

The first die stage (46a, 47a) is essentially identical to the above-described die arrangement of FIG. 11, being arranged to cut two longitudinal rows of spaced slits 15 respectively along the opposite longitudinal edge portions of the strip 10, while simultaneously effecting downward stretching of the strands 17 disposed outwardly of the slits. The upper section 46a of this die stage bears a pair of die members 18a and 18b corresponding to the similarly numbered die members of the die arrangement shown in FIG. 11. The lower die section 47a corresponds to the die block 20 of FIG. 11, having a plane horizontal upper surface of predetermined width narrower than the strip 10 (and very slightly less than the spacing between the two die members 18a and 18b), with square edges extending in parallel relation to the direction of strip feed. The strip is advanced along the upper surface of the die section 47a, in such position that the opposite longitudinal side edge portions of the strip overhang the section 47a by equal amounts. On each downstroke of the upper die 46, the die members 18a and 18b shear through the opposite edge portions of the strip (FIG. 18), cutting a pair of slits respectively adjacent to the strip edges, and simultaneously effecting downward stretching of the two strand portions 17 of the strip respectively disposed outwardly of the two slits, in the same manner as in the operation of the die arrangement of FIG. 11.

The second die stage (46b, 47b) is adapted to effect partial flattening and outward deformation of the strands formed and stretched by the first die stage. To this end, the lower die section 47b of this stage has a diverging pair of planar die faces 50, 51 respectively slanting downwardly and outwardly (e.g. at an angle of about 45° to the horizontal path of strip advance) from the opposite side edges of a horizontal upper surface that is equal in width to the upper surface of section 47a and is disposed in aligned coplanar relation to the latter surface. The upper die section 46b has a downwardly opening channel-shaped configuration conforming in contour to the upper surface and die faces 50, 51 of section 47b; the sides of the channel-shaped configuration conforming in contour to the upper surface and die faces 50, 51 of section 47b; the sides of the channel comprise outwardly and downwardly slanting die faces 52, 53 respectively positioned directly above, and respectively lying in planes parallel to, the lower die faces 50, 51.

Figures 16, 17, 18, 19, 20:
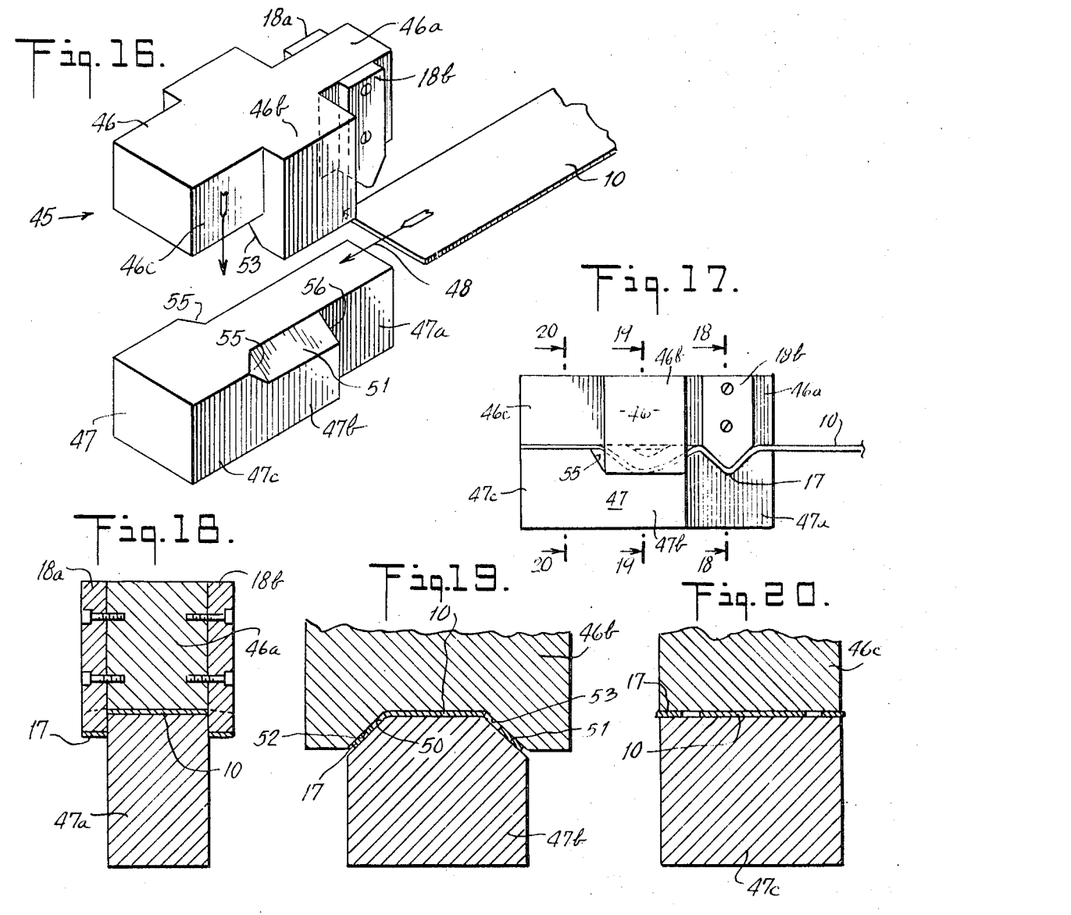
FIG. 16 is a schematic perspective view of a die arrangement for performing the process of the present invention in an alternative embodiment thereof.
FIG. 17 is a side elevational view of the die arrangement of FIG. 16.
FIG. 18 is a view taken along the line 18—18 of FIG. 17.
FIG. 19 is a view taken along the line 19—19 of FIG. 17.
FIG. 20 is a view taken along the line 20—20 of FIG. 17.

When a portion of the strip 10, bearing on opposite side edges a pair of stretched strands 17, is advanced from the first die stage to the second die stage, the strands (projecting downwardly from the strip) rest on the two lower die faces 50 and 51 respectively. Upon a downstroke of the die 46, one of the strands is pressed between the parallel die faces 50 and 52, while the other strand is pressed between the parallel die faces 51 and 53; owing to the described angular orientation of these die faces in relation to the strip, the pressure thus exerted on the strands is effective to deform the strands outwardly while concomitantly flattening them into diverging planes disposed at angles of about 45° to the strip major surface planes, as shown in FIG. 19. That is to say, the die faces are oriented to exert on the strands a deforming force having a component directed outwardly with respect to the strip center line, so as to effect outward deformation of the strands.

The third die stage (46c, 47c) is adapted to complete the flattening and outward deformation of the strands 17. In this stage, the lower die section 47c has a horizontal upper surface, coplanar with the upper surfaces of sections 47a and 47b, but wider than the last-mentioned surfaces, i.e. being substantially equal in width to the maximum transverse dimension of the strip after the strands 17 have been flattened into the strip major surface planes. The upper section 46c has a planar horizontal lower surface disposed directly above the upper surface of section 47c. When a portion of the strip 10 having strands partially flattened and outwardly deformed by the second die stage is advanced to the third die stage, a downstroke of the die 46 presses the strip between the facing surfaces of sections 46c and 47c, further outwardly deforming the strands and flattening them into the major surface planes of the strip, as shown in FIG. 20. Again, owing to the fact that the strands as partially flattened by the second die stage project outwardly from the strip at angles of about 45° to the horizontal, the deforming force exerted by the third die stage on the vertices of the strands has an outwardly directed component to effect the desired outward deformation of the strands.

To facilitate advance of a strip portion with partially flattened strands from the second die stage to the third die stage, the corners of die section 47c facing die section 47b may be beveled in the manner shown at 55 in FIGS. 16 and 17. Similarly, the corners 56 of die section 47b may be beveled to facilitate advanced of the stretched strands 17 from the first die stage to the second die stage.

Performance of the present process with the die arrangement 45 may now be readily explained. The die 46 is advanced repeatedly downward against the die 47, with suitable applied pressure, and withdrawn upwardly after each downstroke, while a strip 10 (e.g. fabricated of steel) is advanced intermittently forward by a predetermined increment after each downstroke of the die 46. On the first downstroke, the die members 18a and 18b cut a pair of parallel slits 15 in the opposite side edge portions of the strip, simultaneously stretching adjacent strand portions 17 of the strip downwardly. As the die 46 is withdrawn upwardly, the strip is fed forward by an amount sufficient to position the stretched strands on the die faces 50 and 51 of die section 47b. The next downstroke of the die 46 partially flattens these two strands (in the manner shown in FIG. 19), while the die members 18a and 18b of the first die stage cut a second pair of slits in the strip behind and in spaced relation to the first pair of slits.

Figure 21:
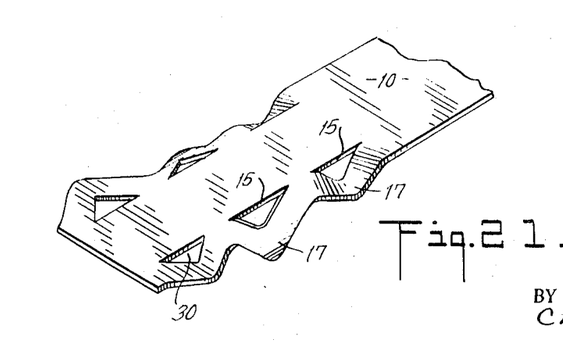
FIG. 21 is a perspective view of a portion of a strip of ductile material illustrating successive stages in formation of openings along the edges of the strip by the die arrangement of FIGS. 16-20.

As the die 46 is again drawn upwardly, the strip is fed forward once more to advance the first, partially flattened pair of strands to the third die stage, and to advance the next (unflattened) pair of strands to the second die stage. The subsequent downstroke of die 46 completes the flattening of the first pair of strands (now positioned in the third die stage), forming a pair of apertures 30, while the second die stage simultaneously partially flattens the second pair of strands, and the first die stage at the same time cuts a third pair of slits behind the second pair of slits in the strip. A strip having three successive pairs of slits and illustrating the forming operations simultaneously performed thereon by the three die stages, respectively, is shown in FIG. 21. The described operation is repeated until a desired number of apertures are formed along the edges of the strip; the strip may then be bent longitudinally if desired, in conventional manner to form an angle member.

While the die arrangement of FIGS. 16–20 is illustrated as having a first stage adapted to cut only a single pair of slits 15 in the strip 10 on each downstroke, the first stage may if desired be elongated in the direction of strip advance and provided with a plurality of die members 18 mounted in aligned relation on each side, so as to cut a corresponding plurality of aligned, spaced slits 15 in each longitudinal edge portion of the strip 10 on each downstroke. In such case, the second and third die stages are similarly elongated so as to work portions of the strip equal in length to the portion in which slits are cut on each downstroke by the first die stage.

Also, while the die arrangement of FIGS. 16–20 is shown as having a single 45° intermediate forming stage (sections 46b, 47b) ahead of the final stage (sections 46c, 47c) which flattens the strands by a further 45° to restore them to the original plane of the strip, a greater number of intermediate forming stages may be provided. Thus, in certain cases, it may be necessary and/or desirable to effect more gradual restoration of the strands to the strip plane, by providing three or more stages having die faces oriented at progressively smaller angles to the horizontal following the first stage (sections 46a, 47a).

Figures 22, 23, 24, 25:
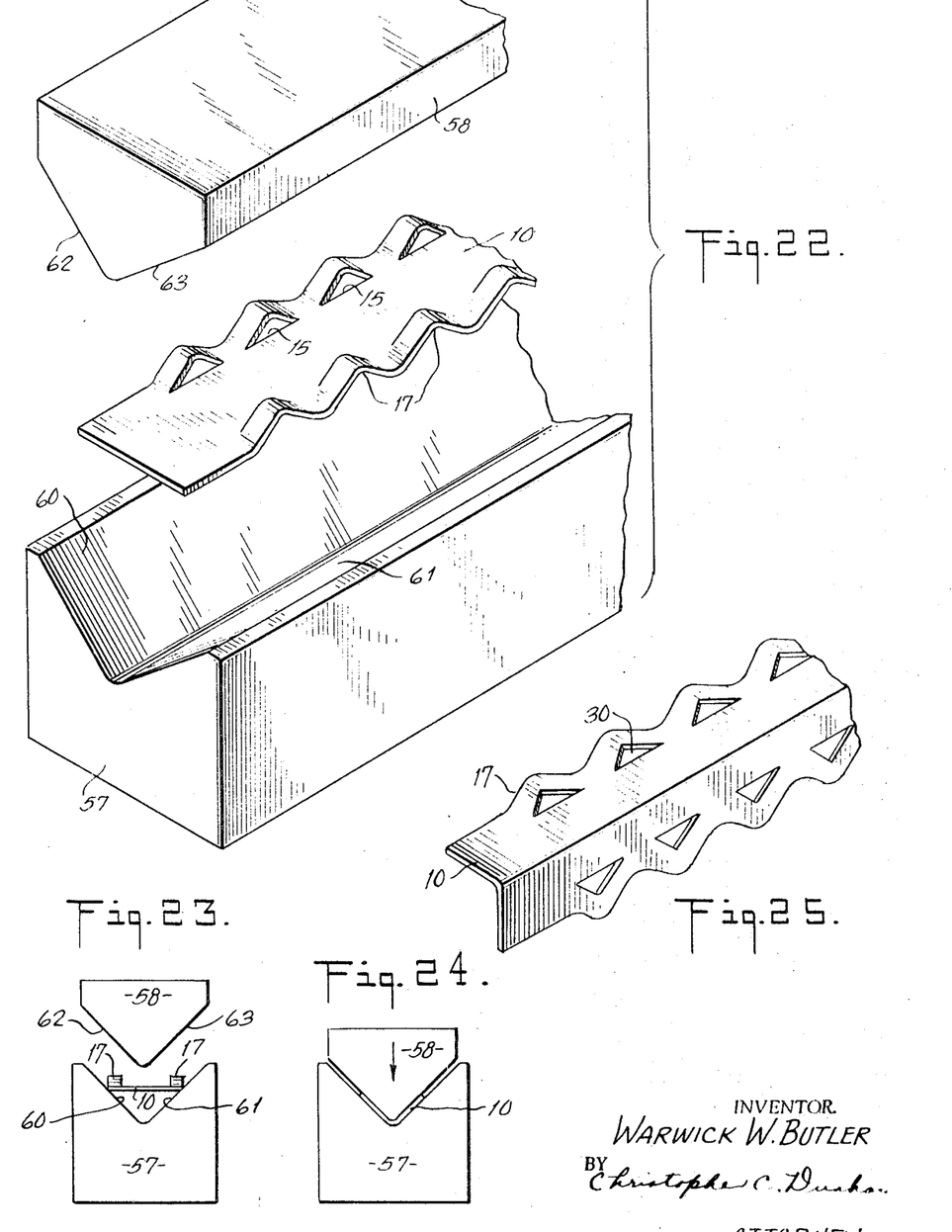
FIG. 22 is an exploded schematic perspective view of a press brake die arrangement suitable for bending a strip about its longitudinal axis to form an angle member and simultaneously performing on the strip the strand-flattened step of the process of the present invention, showing a strip in position to be shaped by the dies.
FIG. 23 is an end elevational view of the die arrangement and strip of FIG. 22.
FIG. 24 is a view similar to FIG. 23 showing the dies in closed position, exerting pressure on the strip.
FIG. 25 is a perspective view of the strip of FIG. 22 after shaping by the press brake dies.

A further die arrangement suitable for performing the strand-flattening step of the present process is illustrated in FIGS. 22–24. This arrangement comprises a stationary lower die 57 and a vertically movable punch 58 of the type employed in conventional press brake apparatus as used e.g. to effect longitudinal bending of a steel strip to form an angle member. In the lower die, an elongated axially rectilinear upwardly opening trough of V-shaped cross section is defined by a pair of planar die faces 60 and 61 converging downwardly at an angle of 90° to each other, each face being oriented at 45° to the horizontal. The punch 58, positioned directly above and aligned with the trough, is adapted to be received therein and has a pair of planar downwardly converging die faces 62 and 63 respectively parallel to the lower die faces 60 and 61. Means (not shown), e.g. of conventional character, are provided for advancing the punch vertically downward into the trough of the lower die with application of pressure effective to deform a workpiece positioned in the trough.

The die arrangement of FIGS. 22–24 may be used in the process of the present invention to form an apertured angle member from a strip 10 of steel or the like having two rows of spaced slits 15 respectively extending along its opposite longitudinal edges with strands 17 stretched in a direction perpendicular to the strip major surface planes, i.e. a strip having strands in the condition shown in FIGS. 4A and 4B described above, as produced, for example, by the die arrangement shown in FIG. 11. This strip is placed in the trough of die 57 as shown in FIGS. 22 and 23, in axially aligned relation to the trough with the strip major surface planes oriented horizontally, the width of the trough being such that the entire trough is received within it. The punch 58 is then brought down into the trough as shown in FIG. 24, bending the strip downwardly along the longitudinal axis of the strip and concomitantly exerting force on the strands 17 in a direction having an outward component, so as to flatten the strands and deform them outwardly. The resultant product, shown in FIG. 25, is an angle member having a 90° longitudinal bend, with a row of apertures 30 along each longitudinal edge formed by the flattening of the strands 17.

The strips produced in accordance with the present invention may be used as flat strips, or bent longitudinally to form angle members as described above, or further bent to form channel members or other shapes as desired for particular purposes. Additionally, it has been found that a steel strip, after the initial cutting and stretching operation described above which produces opposed strands and slits extending along both sides of the strip (i.e. with the strands projecting at 90° to the strip plane) as illustrated by the drawing of the strip in FIG. 22, possesses considerable stiffness and strength as well as a decorative appearance; such a strip is useful, without further forming or flattening of the strands, for such purposes as fenceposts or signposts and decorative trim.

I claim:

1. In procedure for producing a single row of spaced apertures in a longitudinal edge portion of a strip of ductile material having major surfaces lying in parallel planes and a rectilinear longitudinal edge along which said edge portion extends, the steps of
   (a) cutting a row of slits through said edge portion of said strip in aligned spaced relation to each other and in parallel adjacent relation to said longitudinal edge, each of said slits defining the inner edge of a strand portion of said strip lying between the slit and said longitudinal edge; and
   (b) stretching said strand portions in a common direction transverse to the major surface planes of said strip to open said slits in a plane transverse to said major surface planes, the stretched strand portions constituting aligned serrations projecting from one major surface of said strip, transversely of the plane thereof, along said longitudinal edge.

2. Procedure according to claim 1, including the step of flattening the stretched strand portions into the major surface planes of said strip while deforming said strand portions outwardly of said longitudinal edge portion of said strip to open said slits in said major surface planes.

3. Procedure according to claim 2, wherein each said slit is cut, and the strand portion adjacent thereto is stretched, by forcibly advancing a tooth-shaped die member against one major surface of said strip at said longitudinal edge portion in a direction transverse to the major surface planes of said strip while fixedly supporting said strip immediately inwardly of said edge portion, for cutting the slit and simultaneously pushing the strand portion in the last-mentioned transverse direction.

4. Procedure according to claim 3, wherein said flattening step comprises laterally pressure-rolling at least the edge portion of the strip including the stretched strand portions by applying thereto rolling pressure advancing outwardly across the strip toward and in a direction transverse to said longitudinal edge, for flattening said stretched strand portions and concomitantly deforming said strand portions outwardly in the major surface planes of said strip to open said slits in said major surface planes.

5. Procedure according to claim 4, wherein the direction of advance of said rolling pressure is perpendicular to said longitudinal edge.

6. Procedure according to claim 3, wherein said die member has a squared-off inner edge comprising converging edge portions extending in a plane perpendicular to said strip major surface planes, and wherein said strip is supported, during forcible advance of said die member, by a fixed member engaging the major surface of said strip opposite to said one major surface, said fixed member having a squared-off outer edge disposed to cooperate with said die member inner edge to effect cutting of a slit in said strip upon forcible advance of said die member against said one strip major surface, said die member further having a blunt nose for engaging the strand portion adjacent to a slit being cut to push the strand portion as aforesaid.

7. Procedure according to claim 6, wherein a plurality of said slits are cut simultaneously by simultaneously forcibly advancing a plurality of said die members, disposed in spaced aligned relation along strip longitudinal edge portion, against said edge portion.

8. Procedure according to claim 6, wherein said slits are cut in succession by said die member, said strip being fed intermittently longitudinally forward past said die member.

9. Procedure according to claim 3, further including performing said cutting, stretching, and flattening steps at a second longitudinal edge portion of said strip opposite to said first-mentioned edge portion to produce a second row of said apertures in said second edge portion.

10. Procedure according to claim 3, further including bending said strip longitudinally to form an angle member.

11. Procedure according to claim 3, wherein said flattening step comprises pressing said longitudinal edge portion of said strip, including the stretched strand portions, between plane parallel die faces so oriented in relation to the strand portions as to exert thereon a deforming force having a component directed outwardly with respect to said longitudinal edge portion.

12. For use in forming a row of spaced apertures in a longitudinal edge portion of a strip of ductile material having plane parallel major surfaces, during intermittent longitudinal advance of the strip along a defined path, die structure comprising:
  (a) a pair of dies respectively adapted to be disposed in facing relation to opposite major surfaces of a strip in said path with one of the dies mounted for reciprocating movement into and away from the path and the other of the dies fixed in position for register with said one die,
wherein the improvement comprises:
  (b) said pair of dies respectively having first portions mutually disposed and adapted for forming at least one slit in a longitudinal edge portion of a strip in the path while simultaneously stretching a strand portion of the strip longitudinal edge portion adjacent to the slit in a given direction substantially perpendicular to the strip major surface planes, during each movement of said one die into said path;
  (c) said pair of dies respectively having second portions respectively bearing plane parallel die faces mutually disposed and adapted for pressing between them the strip longitudinal edge portion including at least one stretched strand portion during each movement of said one die into said path, said die faces of said die second portions sloping transversely of said path at an acute angle to the strip major surface planes and being so oriented in relation to the stretched strand portion as to exert thereon a deforming force having a component directed outwardly with respect to the path, for partially flattening and outwardly deforming the stretched strand portion;
  (d) said pair of dies respectively having third portions respectively bearing planar die faces parallel to the strip major surface planes and mutually disposed and adapted for pressing between them the strip longitudinal edge portion including at least one partially flattened and outwardly deformed strand portion, to flatten the strand portion into the strip major surface planes, during each movement of said one die into said path; and
  (e) said first, second, and third portions being disposed to be positioned along said path for successively engaging any given point of a strip incident to intermittent advance of the strip along the path.

13. Die structure as defined in claim 12, wherein the first portion of said one die bears a tooth-shaped die member disposed to project toward the path for engaging the strip longitudinal edge portion, said die member having a squared-off inner edge lying in a plane perpendicular to the strip major surface planes and parallel to the path, and wherein the first portion of the other die has a squared-off side edge disposed to be positioned inwardly of and parallel to the strip longitudinal edge portion for cooperating with said die member inner edge to effect cutting of a slit in said strip upon each movement of said one die into said path, said die member further having a blunt nose for engaging the strand portion adjacent to a slit being cut to stretch the strand portion as aforesaid.

14. Die structure as defined in claim 13, wherein said other die has a planar surface extending continuously along all three portions of said other die and disposed to be positioned in flush engagement with one major surface of a strip advancing along said path, said squared-off edge of said first portion of said other die laterally terminating said planar surface, the die face of said second portion of said other die sloping outwardly from said planar surface and forming therewith an intersection aligned with said squared-off edge, andt he die face of the third portion of said other die comprising a portion of said planar surface extending outwardly of said intersection with respect to the center line of the path.

15. For use in forming two rows of spaced apertures respectively in opposite longitudinal edge portions of a strip of ductile material having plane parallel major surfaces, during intermittent longitudinal advance of the strip along a defined path, die structure comprising
  (a) a pair of dies respectively adapted to be disposed in facing relation to opposite major surfaces of a strip in said path with one of the dies mounted for reciprocating movement into and away from the path and the other of the dies fixed in position for register with said one die,
wherein the improvement comprises:
  (b) said pair of dies respectively having first portions mutually disposed and adapted for simultaneously forming at least one pair of parallel slits in opposite longitudinal edge portions of a strip in the path while simultaneously stretching strand portions of the strip longitudinal edge portions respectively adjacent to the slits in a given direction substantially perpendicular to the strip major surface planes, during each movement of said one die into said path;
  (c) said pair of dies respectively having second portions respectively bearing one each of two diverging pairs of plane parallel die faces mutually disposed and adapted for pressing between them the opposite strip longitudinal edge portions each including at least one stretched strand portion during each movement of said one die into said path, said die faces of said die second portions sloping transversely of said path at acute angles to the strip major surface planes and being so oriented in relation to the stretched strand portions as to evert thereon a deforming force having a component directed outwardly with respect to the path, for partially flattening and outwardly deforming the stretched strand portions;

(d) said pair of dies respectively having third portions respectively bearing planar die faces parallel to the strip major surface planes mutually disposed and adapted for pressing between them the opposite strip longitudinal edge portions each including at least one partially flattened and outwardly deformed strand portion to flatten the strand portions into the strip major surface planes during each movement of said one die into said path; and (e) said first, second and third portions being disposed to be positioned along said path for successively engaging any given point of a strip incident to intermittent advance of the strip along the path.

References Cited

UNITED STATES PATENTS

| | | | |
|---|---|---|---|
| 1,509,544 | 9/1924 | Curtis | 29—6.2 |
| 1,583,787 | 5/1926 | Gersman | 29—6.2 |
| 1,624,542 | 4/1927 | Curtis | 29—6.2 |
| 2,104,249 | 1/1938 | Vass | 29—6.2 |
| 3,268,974 | 8/1966 | Felsenthal | 29—6.2 |

FRANK T. YOST, Primary Examiner

U.S. Cl. X.R.

29—163.5R